US012606147B2

(12) United States Patent
Imbert et al.

(10) Patent No.: US 12,606,147 B2
(45) Date of Patent: Apr. 21, 2026

(54) ACTIVATION SYSTEM TO CONTROL THE ACTIVATION OF A CONTROL MEANS AND CONTROL SYSTEM FOR A VEHICLE

(71) Applicant: Faiveley Transport Italia S.P.A., Piossasco (IT)

(72) Inventors: Luc Imbert, Turin (IT); Matteo Frea, Turin (IT)

(73) Assignee: Faiveley Transport Italia S.P.A., Piossasco (IT)

( * ) Notice: Subject to any disclaimer, the term of this patent is extended or adjusted under 35 U.S.C. 154(b) by 18 days.

(21) Appl. No.: 18/713,675

(22) PCT Filed: Nov. 28, 2022

(86) PCT No.: PCT/IB2022/061458
§ 371 (c)(1),
(2) Date: May 27, 2024

(87) PCT Pub. No.: WO2023/095080
PCT Pub. Date: Jun. 1, 2023

(65) Prior Publication Data
US 2025/0018921 A1      Jan. 16, 2025

(30) Foreign Application Priority Data
Nov. 29, 2021      (IT) ........................ 102021000030083

(51) Int. Cl.
*B60T 17/22*        (2006.01)
*B60T 13/66*        (2006.01)

(52) U.S. Cl.
CPC .......... *B60T 17/228* (2013.01); *B60T 13/665* (2013.01)

(58) Field of Classification Search
CPC ...... B60T 17/228; B60T 13/665; B60T 13/66; B60Y 2200/30; B60Y 2400/81
See application file for complete search history.

(56) References Cited

U.S. PATENT DOCUMENTS 3,385,964 A   *   5/1968   Deodat .................. B61L 17/00
                                            246/182 BH
3,490,814 A   *   1/1970   Smith .................. B60T 8/1893
                                            303/3

(Continued)

FOREIGN PATENT DOCUMENTS

CA         2826553 A1      7/2008
WO    2023095080 A1      6/2023

OTHER PUBLICATIONS

International Search Report and Written Opinion for corresponding International PCT Application No. PCT/IB2022/061458, mailed Mar. 14, 2023.

*Primary Examiner* — Grant Moubry
*Assistant Examiner* — Ruben Picon-Feliciano
(74) *Attorney, Agent, or Firm* — K&L Gates LLP

(57)        ABSTRACT

An activation system is described which controls the activation of at least one control means installed in a vehicle including a braking system including a main brake pipe containing a fluid. The control means assumes a resting state in which it consumes a first value of electrical energy and an active state in which it consumes a second value of electrical energy, greater than the first value of electrical energy. The activation system measures the pressure value of the fluid within the main brake pipe and generate an activation signal when the pressure value of the fluid within said main brake pipe is equal to or less than a first predetermined threshold value. The control means receives the activation signal and switches from the resting state to the active state when the control means is in the resting state and receives the activation signal.

12 Claims, 6 Drawing Sheets

(56)　　　　　References Cited

U.S. PATENT DOCUMENTS

| | | | |
|---|---|---|---|
| 3,532,878 A * | 10/1970 | Morrill | B60T 7/18 |
| | | | 246/182 BH |
| 5,222,788 A * | 6/1993 | Dimsa | B60T 13/665 |
| | | | 303/20 |
| 9,331,865 B2 | 5/2016 | de Haas | |
| 2005/0099061 A1 | 5/2005 | Hollandsworth et al. | |
| 2008/0067866 A1 | 3/2008 | Root et al. | |
| 2008/0149781 A1* | 6/2008 | Root | B60T 17/228 |
| | | | 246/167 R |
| 2019/0315231 A1* | 10/2019 | Widmer | G01K 3/04 |
| 2022/0032978 A1* | 2/2022 | Haas | B61L 15/0018 |

* cited by examiner

ACTIVATION SYSTEM TO CONTROL THE ACTIVATION OF A CONTROL MEANS AND CONTROL SYSTEM FOR A VEHICLE

CROSS-REFERENCE TO RELATED APPLICATIONS

This application is a U.S. National Stage Entry under 35 U.S.C. § 371 of International Patent Application No. PCT/IB2022/061458, entitled ACTIVATION SYSTEM TO CONTROL THE ACTIVATION OF A CONTROL MEANS AND CONTROL SYSTEM FOR A VEHICLE, filed Nov. 28, 2022, which claims benefit to Italian Application No. 102021000030083, filed Nov. 29, 2021, the entire disclosures of which are hereby incorporated by reference herein.

TECHNICAL FIELD

The present invention is generally in the field of vehicles; in particular, the invention relates to an activation system arranged to control the activation of at least one control means, arranged to be installed on at least one vehicle, and to a control system including this activation system.

PRIOR ART

This section will discuss the prior art related to activation systems arranged to control the activation of at least one control means installed on at least one vehicle.

In the following, reference will be made to the rail vehicle sector, particularly the freight rail vehicle sector. It is well known that a freight railway convoy is composed of a plurality of freight rail vehicles, which include at least one driving locomotive followed by at least one freight car.

The freight transportation industry is technologically far from the passenger transportation industry.

Typical freight car braking systems are purely mechanical and pneumatic. Pneumatics are used to propagate the braking demand from the locomotive to the wagons through a main brake pipe (BP).

As may be observed in FIG. 1, locally on a freight vehicle, a distributor 100 reacts to the pressure of the main brake pipe 102 by generating a command pressure 103 (DC). This command pressure 103 and a bogie load pressure 104 (PL) are fed by a self-adjusting relay valve 106 which exerts pressure in the brake cylinders 108, generating braking force through levers and calipers.

As may be observed in FIG. 1, the distributor 100 and the self-adjusting relay valve 106 are also connected to a brake power reservoir 110. The distributor 100 receives (during braking)/generates (during brake release) a reference braking pressure 112.

This basic architecture may be modified according to the braking forces required, in accordance with the type of actuators used (pad brake or disc brake).

Freight cars usually do not include electronic means, due to the fact that the performance increase associated with the use of electronic means is not necessary, and due to the fact that there are no battery lines running from the locomotive to the subsequent freight cars. This lack of battery lines makes the use of electronic means problematic due to the lack of availability of electrical energy.

In the case of an absence of battery lines, one could rely on potential energy recovered through special energy recovery means/systems (e.g. related to the recovery of braking energy). Disadvantageously, the available recovered energy is usually not sufficient to ensure the operation of such electronic means for long periods of operation.

A well-known function is brake testing. Given the absence of electronic means, this test is done manually by the driver following a defined process. This process may be summarized by the following steps:

- check the brake release status on the first vehicle following the locomotive;
- determine the release and braking status on all vehicles (on both sides of the convoy);
- brakes that are disengaged and not marked as defective must be engaged;
- check the correct setting of the brake lever position G/P;
- change the correct load shift setting (if available);
- check for proper coupling.

Disadvantageously, such a process for brake testing, being done manually without electronic means, is time-consuming and more prone to errors.

The above applies similarly to vehicles in additional sectors, such as rubber-wheeled vehicles or convoys, that need to optimize the management of energy available to any electronic controls or that have no electronic controls distributed along the vehicle.

SUMMARY OF THE INVENTION

One object of the present invention is to propose a solution for improving the management of the activation of a control means installed on a vehicle in order to reduce its energy consumption.

A further object is to enable the use of in-vehicle electronic means, even in the event of low power supply availability along the vehicle or along a convoy including a plurality of vehicles.

A further object of the present invention is to provide a solution that may also be used in the area of freight vehicles, and which allows the presence of electronic means on board such vehicles to be exploited to make the freight transport sector more competitive, for example, by revamping the manual implementation of existing functions and incorporating additional functionality. In fact, most new technological solutions on freight vehicles would require the use of electronic means. The presence of such electronic means would allow existing functions to be implemented in a different way (less time-consuming/more cost-effective and more reliable in terms of the objectivity of the result) and would also allow new features to be added.

Technology to be developed based on electronics exists, such as energy harvesters, batteries, sensors, GPS, wireless communications, and microcontrollers. However, in order to use these functions on a freight transport vehicle, compromises must be made to limit their energy consumption.

Limiting energy consumption is key, especially in the case of freight vehicles, which often remain parked in warehouses without being used even for long periods of time.

The aforesaid and other objects and advantages are achieved, according to one aspect of the invention, by an activation system arranged to control the activation of at least one control means having the features described herein and by a control system having the features described herein. Preferred embodiments of the invention are also taught in the present description.

BRIEF DESCRIPTION OF THE DRAWINGS

The functional and structural features of some preferred embodiments of an activation system arranged to control the activation of at least one control means and a control system according to the invention will now be described. Reference is made to the accompanying drawings, in which.

DETAILED DESCRIPTION

Figure 1:
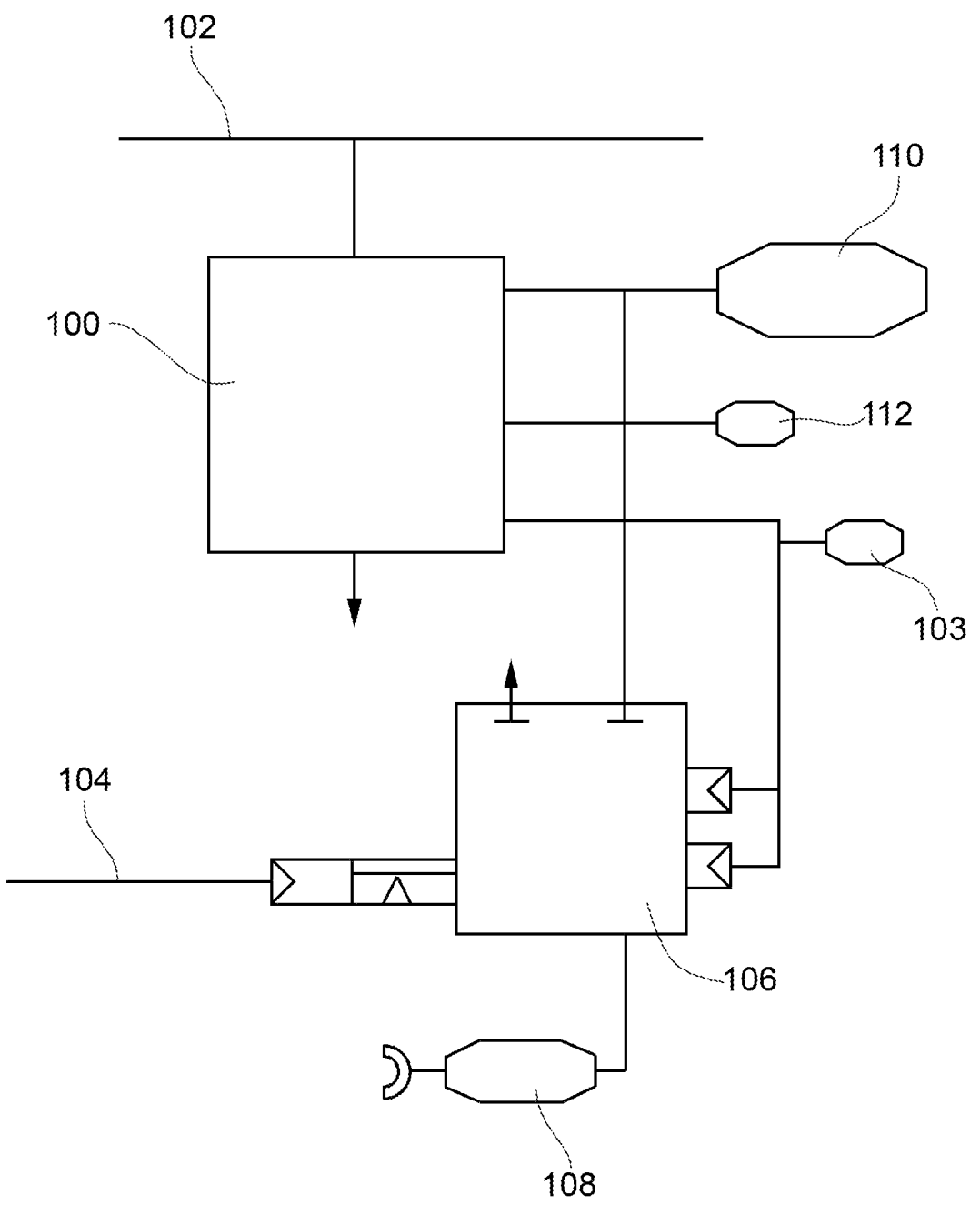
FIG. 1 illustrates a sample structure of a freight vehicle according to the prior art.

Before explaining in detail a plurality of embodiments of the invention, it should be clarified that the invention is not limited in its application to the design details and configuration of the components presented in the following description or illustrated in the drawings. The invention is able to assume other embodiments and to be implemented or constructed in practice in different ways. It should also be understood that the phraseology and terminology have a descriptive purpose and should not be construed as limiting. The use of "include" and "comprise" and the variations thereof are intended to cover the elements set out below and their equivalents, as well as additional elements and the equivalents thereof.

Figure 2:
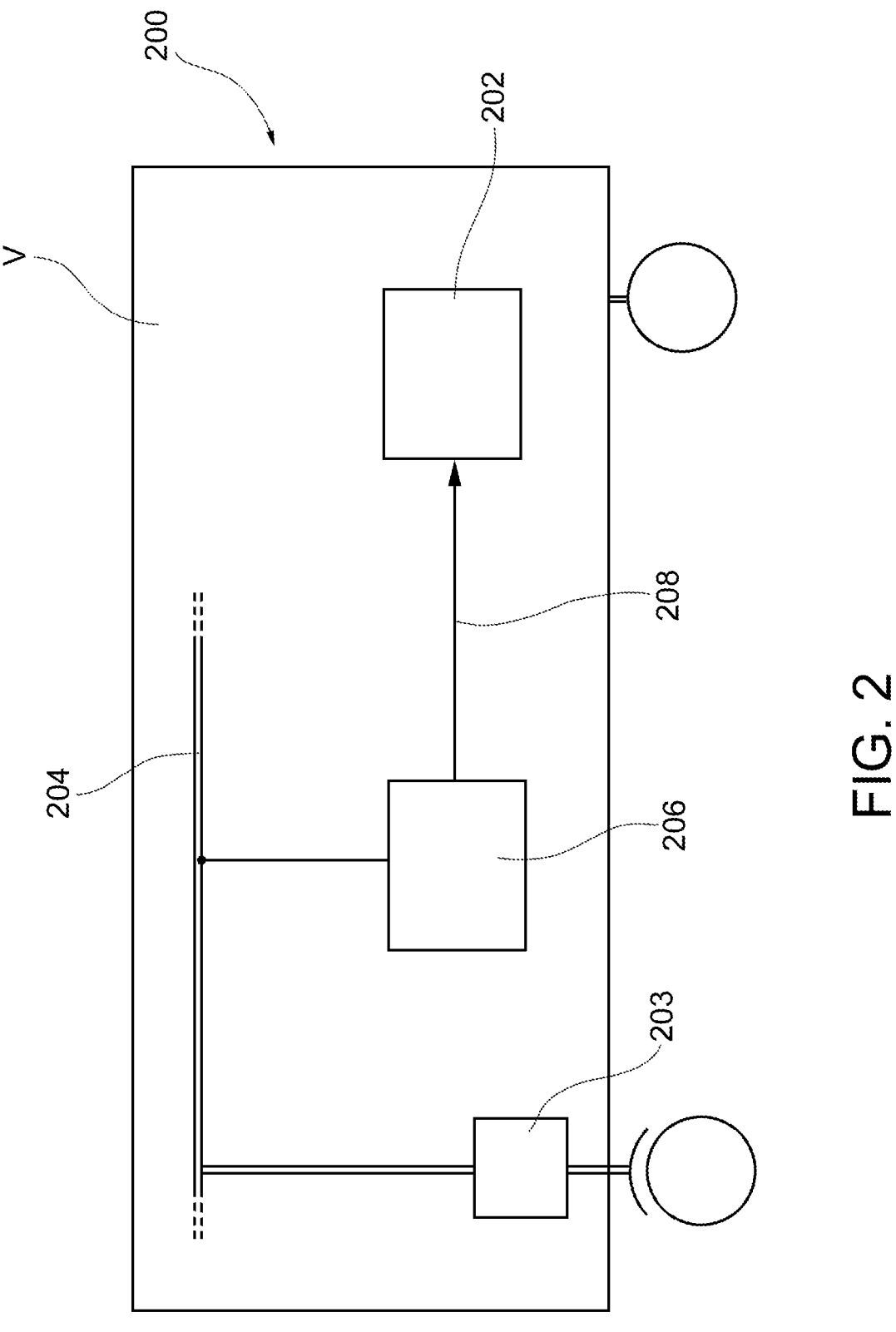
FIG. 2 shows a first embodiment of an activation system arranged to control the activation of at least one control means.

FIG. 2 shows a first embodiment of an activation system 200 arranged to control the activation of at least one control means 202.

The control means 202 is arranged to be installed on at least one vehicle V.

The vehicle V includes a braking system 203 that has a main brake pipe 204 arranged to contain a fluid. For example, the fluid may be compressed air.

The braking force is arranged to be generated by the braking system according to a pressure value of the fluid within the main brake pipe.

For example, the lower the fluid pressure within the main brake pipe, the greater the braking force produced.

The at least one control means is arranged to assume a resting state in which it consumes a first value of electrical energy and an active state in which it consumes a second value of electrical energy, greater than said first value of electrical energy.

The activation system further comprises a pressure monitoring means 206 arranged to:

measure the pressure value of the fluid inside the main brake pipe; and generate an activation signal 208 when said pressure value of the fluid within the main brake pipe is equal to or less than a first predetermined threshold value.

The control means 202 is arranged to receive said activation signal generated by the pressure monitoring means.

Furthermore, the control means is arranged to switch from the resting state to the active state when the control means is in the resting state and receives said activation signal.

Preferably, the control means may be arranged to remain in the active state when the control means is in the active state and receives said activation signal.

The present invention is therefore based on addressing the problem of power consumption through optimized management of the transition from an active state to a resting state of the at least one control means.

For example, the at least one control means 202 may be at least one among a controller, processor, microcontroller, microprocessor, FPGA, PLC, control system, control unit, control box, or control device.

Preferably, the pressure monitoring means may also be arranged to:

generate a deactivation signal when said pressure value of the fluid within the main brake pipe is equal to or less than a second predetermined threshold value, lower than said first predetermined threshold value, for at least a predetermined time interval.

The control means may be arranged to receive the deactivation signal generated by the pressure monitoring means.

The control means may also be arranged to, when the control means is in the active state, return said control means to the resting state when it receives said deactivation signal from the pressure monitoring means.

Preferably, the pressure monitoring means may include at least one pressure transducer and one comparison means.

The comparison means may be arranged to compare the pressure value measured by the pressure transducer with said first predetermined threshold value.

The comparison means may also be arranged to generate the activation signal when the pressure value of the fluid inside the main brake pipe is equal to or less than the first predetermined threshold value.

Preferably, the pressure monitoring means may be arranged to measure the pressure value of the fluid within the main brake pipe at predetermined measurement instants generated by a timing means in accordance with a predetermined measurement period.

For example, the timing means may be a timer.

Preferably, the pressure monitoring means may include a pressure switch.

The present invention also relates to a control system for at least one vehicle.

The vehicle again includes a braking system including a main brake pipe arranged to contain a fluid. A braking force is arranged to be generated by the braking system depending on a pressure value of the fluid within the main brake pipe.

In one embodiment, the control system includes an activation system according to any of the embodiments described above, and at least one electronic means arranged to perform a predetermined function and be controlled by the control means of said activation system.

Preferably, said at least one electronic means may be arranged to monitor the operation of at least one operating device or operating system installed on the at least one vehicle.

For example, the electronic means may be an electronic device, an electronic system, an electronic control unit, an electronic component, and the like.

Preferably, the at least one electronic means may include at least one of:

a pressure transducer;

a contact sensor;

a proximity sensor;

a force sensor;

a temperature sensor;

an accelerometer sensor.

5

Preferably, the at least one electronic means may be arranged to be installed on the main brake pipe of the vehicle or on at least one secondary pipe of the vehicle. The at least one secondary pipe in such a case may be arranged to receive the fluid from the main brake pipe.

Preferably, the control system may additionally include at least one among:

a wireless communication means;

a means for monitoring the stability of a bogie of the vehicle;

a power source management means;

a unique identifier localization means;

a geolocation means;

a maintenance means;

a predictive maintenance means;

a cloud connection means;

a means for data acquisition and processing.

Preferably, when the control system further includes at least said wireless communication means, the control means of the activation system may further be arranged to transmit, through said wireless communication means, data obtained from said at least one electronic means controlled by said control means.

Preferably, when the control system further comprises at least said cloud connection means, said control means of the activation system may additionally be arranged to store in the cloud, through said cloud connection means, data obtained from said at least one electronic means controlled by said control means.

Preferably, the at least one electronic means may be at least one among:

an automatic braking test device/system;

a device/system for detecting undue braking;

a vehicle axle or bogie stability monitoring device/system;

a device/system for detecting geometric defects of at least one wheel of the vehicle;

a vehicle integrity verification device/system;

a vehicle composition verification device/system;

a device/system for the management of the at least one vehicle;

a device/system for verifying an overload condition of the at least one vehicle;

a device/system for monitoring the speed of the at least one vehicle;

a device/system for monitoring the acceleration of the at least one vehicle;

a device/system for monitoring the position of the at least one vehicle.

Figure 3:
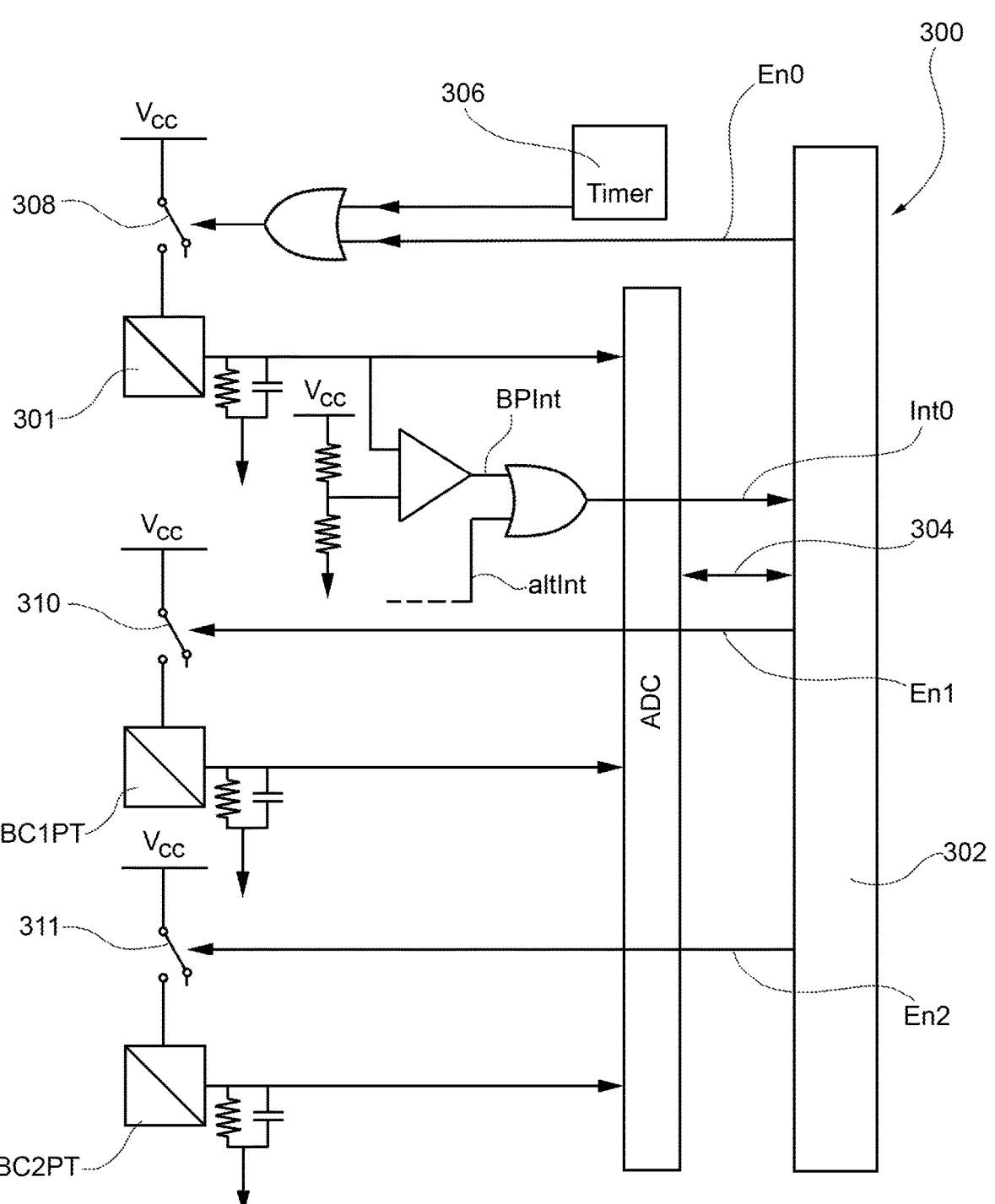
FIG. 3 illustrates an implementation example of an activation system arranged to control the activation of at least one control means of at least one vehicle.

FIG. 3 shows an implementation example of an activation system arranged to control the activation of at least one control means of at least one vehicle. Such an activation system is obtained by way of example by means of an electrical circuit 300 arranged to manage the power distribution and transitions from the active state to the resting state, and vice versa, of the at least one control means 302.

In a default state, power is available but not connected to the various electronic means. Only the control means 302, e.g., a microcontroller, and a timer means 306, e.g., a timer circuit, are powered.

In the default state, the control means 302 is in the resting state.

An activation ("wake-up") signal is a dedicated interrupt signal Int0 that allows the control means to be activated.

The dedicated interrupt signal Int0 may come from an OR port. At an input of the OR port a BPInt signal is provided that is arranged to be generated by a comparison means, e.g., a comparator, the state of which is driven by a pressure sensor means. In this example, the pressure sensor means is a pressure transducer 301.

At an additional input of the OR port there is an alternative interrupt signal altInt, which will be described in more detail later in the present description.

The output of the comparator generating the BPint signal is arranged to change state at a predetermined threshold value. In other words, the generation of the interrupt BPint is related to the pressure read by the pressure transducer 301. In this case, the pressure read by the pressure transducer 301 is that of the main brake pipe.

The nominal pressure of the main brake pipe is usually between 4 and 6 bar. The predetermined threshold value of the comparator to detect the change of state may be less than 4 bar. Preferably, the predetermined threshold value may be set below the service braking pressure range to avoid spurious generation of interrupt signals; for example, this predetermined threshold value could be 2.5 bar.

The comparator may further include a hysteresis to further prevent spurious interrupt generation.

The supply line of the pressure transducer that reads the pressure inside the main brake pipe may be connected to the supply line a normally open switch 308.

This switch is arranged to be controlled, through an OR port, by the independent timing means 308 ("Timer"), or by the control means itself via the En0 signal.

The independent timing means 306, Timer, may be used to periodically close the switch and energize the pressure transducer 301.

The switch 308 may also be controlled by the control means 302, allowing the pressure transducer to be kept activated for longer periods of time, such as for specific measurements or to increase the periodicity of the measurement.

Some electronic control means may integrate low-power timing means. In this case, such an integrated timing means may be used to avoid the use of an independent external timing means.

FIG. 3 shows two additional sensors corresponding to pressure transducers BC1PT, BC2PT, arranged to be connected to the brake cylinders.

The embodiment in FIG. 3 also features an ADC converter that converts the analog signals from the vai transducers to digital signals for the control means 302.

The electrical circuit may integrate dedicated enable signals En1, En2 connected to normally open switches 310, 311 arranged on the supply lines of the pressure transducers BC1PT, BC2PT. By controlling the enable signals En1, En2, the control means will be able to energize the pressure transducers BC1PT, BC2PT for certain periods of time and control the periodicity of the measurement.

The periodicity and a time Ton of the independent timing means 306, Timer, which is related to the generation of the activation signal, is a critical choice because it will determine the consumption during the resting state.

For periodicity, the first approximation is to consider the maximum detection delay authorized by the activation system. The second approximation is to consider the duration of the transient state of the measured pressure, which may allow the change to be detected without introducing a significant delay.

For the time Ton, the minimum duration may be related to the time it takes for the pressure transducer 301 to accurately generate a signal proportional to the measured pressure.

With the periodicity and time Ton, the duty-cycle may therefore be calculated.

In a numerical example, considering a periodicity of 45 seconds (equivalent to the transient time of the main brake pipe) and a time Ton of 0.15 seconds (equivalent to an example time required for the pressure transducer 301 to generate a voltage proportional to the measured pressure) the resulting duty-cycle would be 0.33%.

In other words, the power consumption during the resting state would be 0.33% of the nominal consumption of the pressure transducer.

In addition to the consumption during the resting state, the consumption in the active state may also be managed.

The generation of the enable signals En0, En1, En2 during the active state of the control means may depend on the type of analysis envisaged.

At least three types of analysis may be expected from the measured data:

checking the coherence of signals;

drift identification;

event counter.

Checking the coherence of the signals may require a low periodicity of measurement since the goal is to detect steady states and check the coherence between them.

$$T < \frac{t_{transient}}{n}$$

Drift identification may require more periodicity of measurement in order to be able to monitor the transient state and be able to compare it with an expected transient state, which means that several measurement points are needed during this time frame.

$$T \geq t_{transient}$$

On the other hand, the event counter may require variable measurement periodicity. In fact, the periodicity may depend on how the counter means are defined. Event counting could be based on a narrow range of values or on counting occurrences of the constant state.

According to the type of analysis required and the number of measurements needed, the periodicity of the enable signals En0, En1, En2 may be selected.

As mentioned earlier, the periodicity of the measurement may therefore be chosen according to the intended analysis.

The activation of the at least one control means and the management of measurements once activated have been discussed above. However, returning to the resting state is also an event that has an impact on the overall energy consumption.

The condition of returning to the resting state may be based on the recognition that the pressure in the main brake pipe is below a predetermined threshold, such as below 0.5 bar for a predetermined period of time. For example, this time period may be set between 10 minutes and 1 hour.

In the present invention, the pressure of the main brake pipe may therefore be selected as the trigger element for the activation and return to resting state. This choice may be based, for example, on the fact that the main brake pipe at 0 bar represents a braking state or the stopped state of the vehicle, and 5 bar represents the operational state of the vehicle. Thus, by monitoring a single pressure it is possible to understand the state the vehicle is in.

Figure 4:
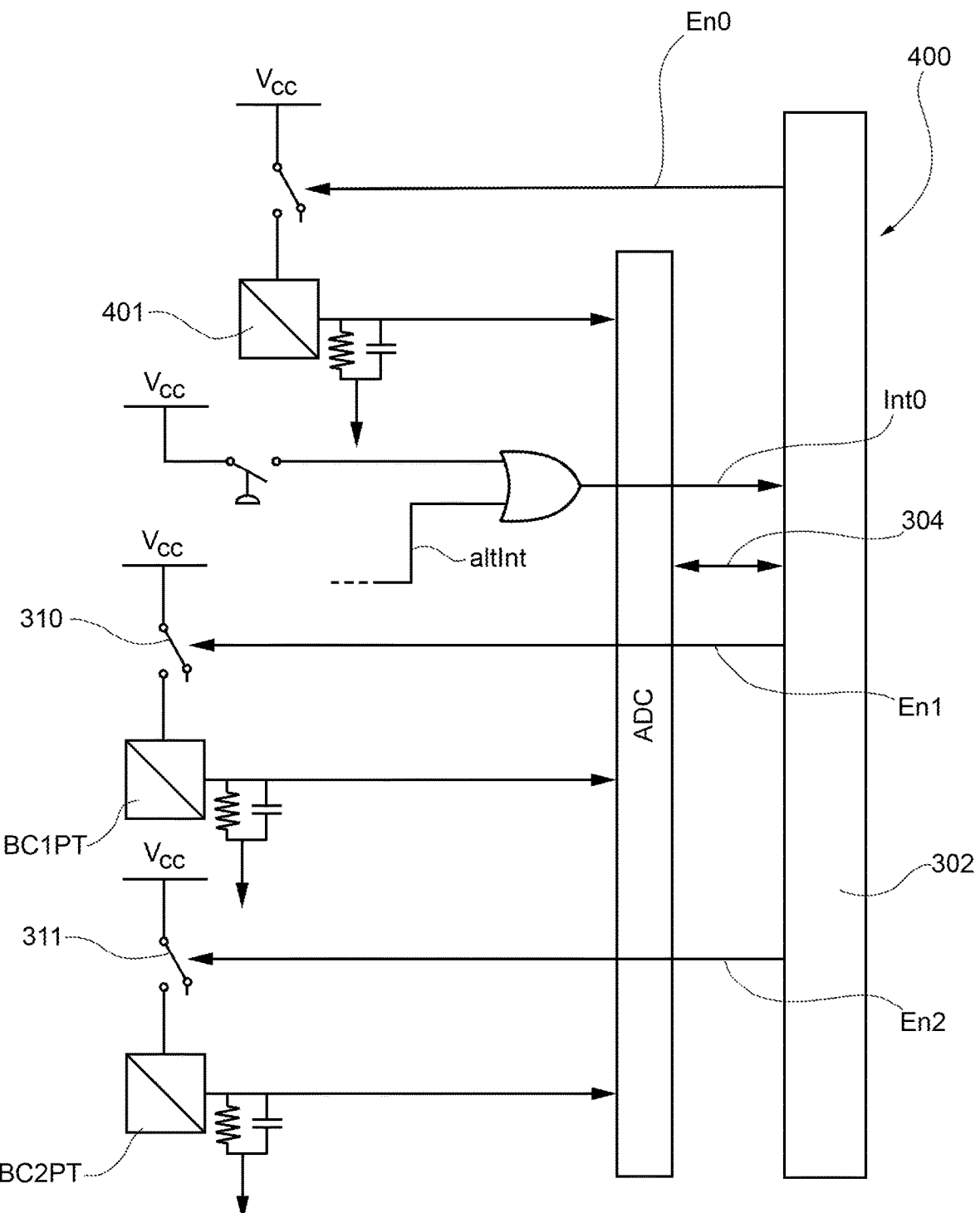
FIG. 4 shows a second implementation example of an activation system arranged to control the activation of at least one control means of at least one vehicle.

FIG. 4 illustrates a second alternative implementation example of an activation system set up to control the activation of at least one control means of at least one vehicle. In this alternative embodiment, an electrical circuit 400 would again comprise a pressure sensor means set up to measure the pressure of the main brake pipe. In this example, the pressure sensor means could be a pressure switch 401. In this case, the pressure switch may be instructed to generate the alternative interrupt signal altInt.

Using the pressure switch could reduce the overall energy consumption. However, should the pressure transducer described in the first embodiment also be present, for monitoring purposes, the overall system cost may increase due to the additional component.

In FIG. 4, similar items already shown in FIG. 3 will be referred to using the same references.

In other implementation examples, the alternative interrupt signal altInt may also be otherwise generated by other means/devices/systems, in addition to the pressure transducer or pressure switch. For example, accelerometers or radio technologies may generate an interrupt signal.

The fact that the alternative interrupt signal altInt may also be generated by other means/devices/systems makes it possible to bring the control means into the active state before the composition phase of a convoy of vehicles. For example, a radio peripheral would allow the remote control means to be woken up.

In the implementation example of FIG. 4, an ADC converter is set up to convert the analog signals from the vai pressure transducers and the pressure switch 401 to digital signals 304 for the control means 302.

The following will provide an example of using the activation system according to the present invention in a control system installed on a vehicle. In particular, a possible use in the field of rail freight vehicles will be shown.

Figure 5:
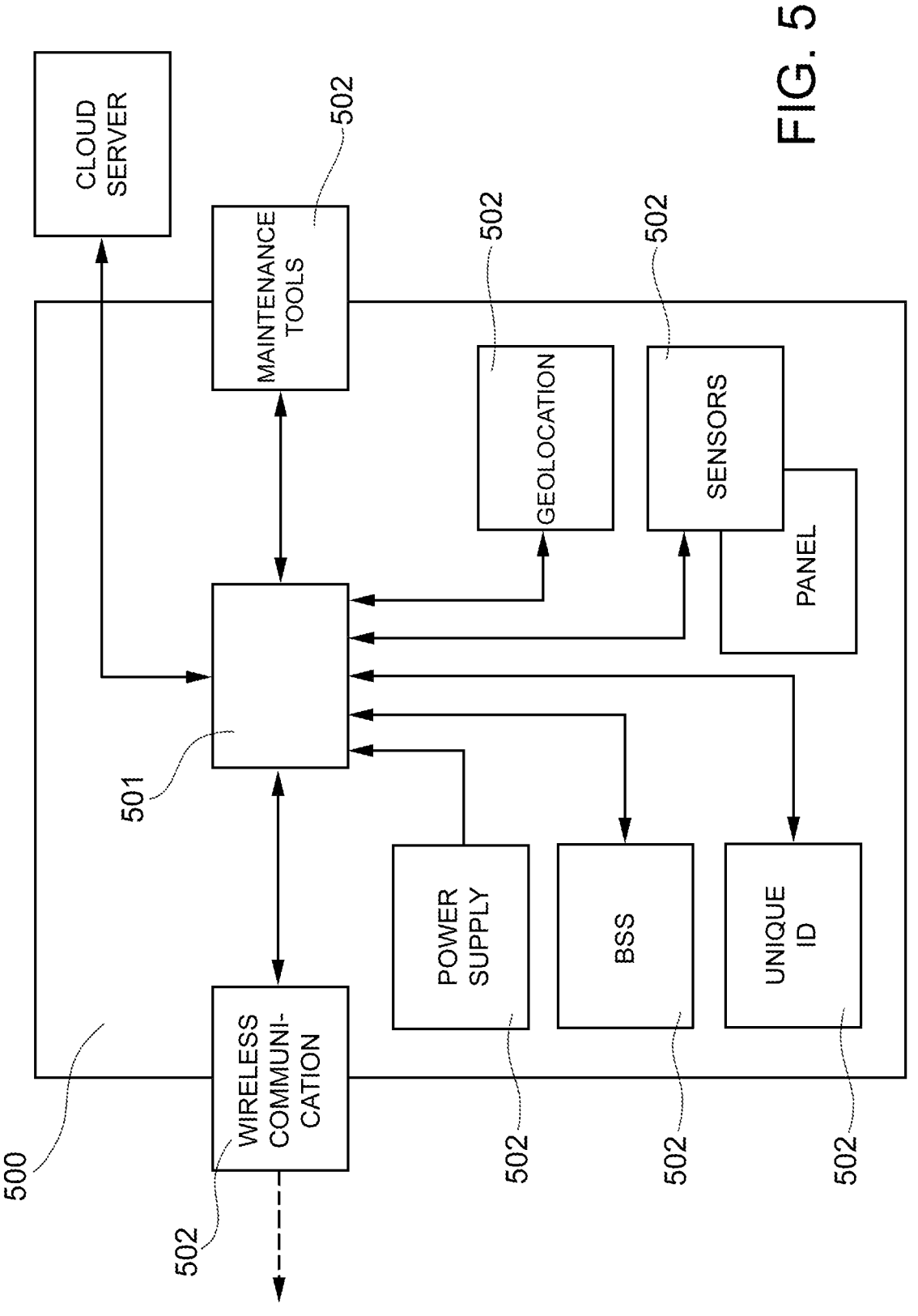
FIG. 5 shows a functional block diagram indicative of a series of functions that may be performed by a control system according to the present invention.

A control system that includes the activation system according to the present invention enables the ability to perform a series of functions corresponding to the functional block diagram shown in FIG. 5. The activation system corresponds to the block 500.

As may be seen in FIG. 5, the control system 501 is arranged to control/interact with various electronic means 502.

Such peripheral functions may be used to monitor the one or more rail vehicles and extract information relevant to the operation and maintenance of at least one rail vehicle or rail convoy.

Each electronic means may be for example:

a wireless communication means: communication from wagon to locomotive;

a power source management means: collection and management of energy storage in a local battery/adaptability to the battery of the vehicle/railway convoy;

a vehicle bogie stability monitoring means, BSS: bogie stability monitoring sensors;

a unique identifier localization means: rail vehicle identification;

a geolocation means: location of the rail vehicle;

a sensor means: pressure, position, force, etc.;

a maintenance means: maintenance port;

a predictive maintenance means;

a cloud connection means: cloud server/remote server connection;

a means of data acquisition and processing: "Core."

The sensors may be used for brake monitoring, for example, and the sensors may be mounted directly on the panel. Another option is to mount the sensors directly on the pipe, allowing easy retrofit operations.

Figure 6:
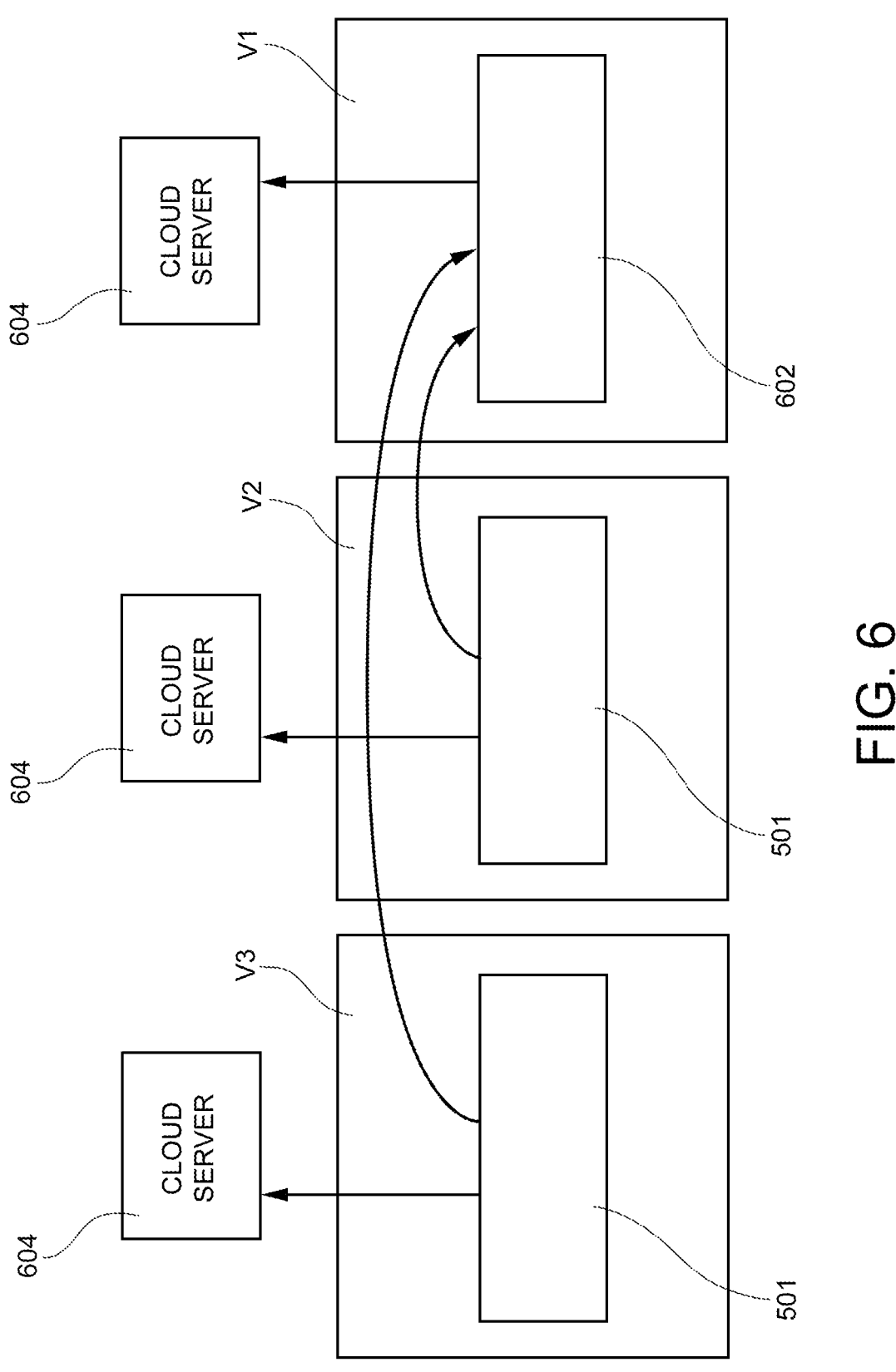
FIG. 6 shows, by way of example, how the concentration of information collected by the control system may occur.

As observable in FIG. 6, by means of the control system 501 of at least one vehicle described above, it is possible to concentrate the information collected on the rail vehicles V1, V2, V3 and to send it to an information collector 602 installed on board the rail vehicle V1 that performs the locomotive function. Another flow of information may be from the various rail vehicles (e.g., the locomotive V1 and the wagons/freight cars V2, V3) directly to the cloud server 604.

The use of an energy-efficient activation system may allow the overall system consumption to decrease and rely on a power source based on an energy harvester and a battery.

The benefit achieved is therefore that of having provided a solution that enables the electrical consumption of electronic means in vehicles, such as rail vehicles in the freight transport sector, to be optimized.

As described above, this invention may preferably be applied to the railway vehicle sector traveling on tracks. For example, a vehicle as referred to herein may be a locomotive, and a course/route may include tracks on which the wheels of the locomotive roll. The embodiments described herein are not intended to be limited to vehicles on tracks. For example, the vehicle may be a car, a truck (for example a highway semi-trailer truck, a mining truck, a truck for transporting timber or the like), a motorcycle or the like, and the route may be a road or a trail.

Various aspects and embodiments of an activation system arranged to control the activation of at least one control means of at least one vehicle and a control means according to the invention have been described. It is understood that each embodiment may be combined with any other embodiment. Moreover, the invention is not limited to the embodiments described, but may be varied within the scope defined by the appended claims.

The invention claimed is:

1. A control system for at least one vehicle that includes a braking system including a main brake pipe arranged to contain a fluid, wherein a braking force is arranged to be generated by the braking system as a function of a pressure value of the fluid within the main brake pipe, wherein said control system includes:
  an activation system arranged to control an activation of at least one control means,
    wherein said control means is arranged to be installed in the at least one vehicle;
    wherein said control means is arranged to assume a resting state in which it consumes a first electrical energy value and an active state in which it consumes a second electrical energy value, greater than said first electrical energy value;
    said activation system comprising a pressure monitoring means arranged to:
      measure the pressure value of the fluid within the main brake pipe; and
      generate an activation signal when said pressure value of the fluid within said main brake pipe is equal to or less than a first predetermined threshold value;
    wherein said control means is arranged to receive said activation signal generated by the pressure monitoring means; and
    wherein said control means is further arranged to:
      when the control means is in the resting state and receives said activation signal, switch from the resting state to the active state; and at least one electronic means arranged to perform a predetermined function and be controlled by the control means of said activation system,
    wherein said at least one electronic means is a vehicle axle or bogie stability monitoring device/system.

2. The control system of claim 1, wherein said pressure monitoring means is further arranged to:
  generate a deactivation signal when said pressure value of the fluid within the main brake pipe is equal to or less than a second predetermined threshold value, less than said first predetermined threshold value, for at least a predetermined time interval;
  wherein said control means is arranged to receive said deactivation signal generated by said pressure monitoring means; and
  wherein said control means is further arranged to:
    when said control means is in the active state, return said control means to the resting state when it receives said deactivation signal from the pressure monitoring means.

3. The control system of claim 1, wherein the pressure monitoring means includes:
  at least one pressure transducer; and
  a comparison means arranged to compare the pressure value measured by the pressure transducer with said first predetermined threshold value;
  wherein said comparison means is arranged to generate the activation signal when the pressure value of the fluid within the main brake pipe is equal to or less than said first predetermined threshold value.

4. The control system of claim 1, wherein said pressure monitoring means is arranged to:
  measure the pressure value of the fluid within the main brake pipe at predetermined measurement instants generated by a timing means in accordance with a predetermined measurement period.

5. The control system of claim 1, wherein the pressure monitoring means includes a pressure switch.

6. The control system of claim 1, wherein said at least one electronic means is arranged to monitor an operation of at least one operating device or operating system installed on board the at least one vehicle.

7. The control system of claim 1, wherein said at least one electronic means includes at least one of:
  a pressure transducer;
  a contact sensor;
  a proximity sensor;
  a force sensor;
  a temperature sensor; or
  an accelerometer sensor.

8. The control system according of claim 1, wherein said at least one electronic means is arranged to be installed on the main brake pipe of the vehicle or on at least one secondary pipe of the vehicle; and
  wherein said secondary pipe is arranged to receive the fluid from the main brake pipe.

9. The control system of claim 1, further comprising at least one of:
  a wireless communication means;
  a means for monitoring a stability of a vehicle bogie;
  a power source management means;
  a unique identifier localization means;
  a geolocation means;
  a maintenance means;
  a predictive maintenance means;
  a cloud connection means; or
  a means of data acquisition and processing.

10. The control system of claim 1, further comprising a wireless communication means, wherein said control means of the activation system is further arranged to transmit, via said wireless communication means, data derived from said at least one electronic means controlled by said control means.

11. The control system of claim 1, further comprising a cloud connection means, wherein said control means of the activation system is further arranged to store in the cloud, via said cloud connection means, data derived from said at least one electronic means controlled by said control means.

12. The control system of claim 1, wherein said at least one electronic means is further at least one of:

an automatic braking test device/system;

a device/system for detecting undue braking;

a device/system for detecting geometric defects of at least one wheel of the vehicle;

a vehicle integrity verification device/system;

a vehicle composition verification device/system;

a device/system for management of the at least one vehicle;

a device/system for verifying an overload condition of the at least one vehicle;

a device/system for monitoring a speed of the at least one vehicle;

a device/system for monitoring an acceleration of the at least one vehicle; or a device/system for monitoring a position of the at least one vehicle.

\* \* \* \* \*